Dec. 7, 1937.  E. J. PROTIN  2,101,451
THREAD PROTECTOR
Filed Sept. 1, 1936
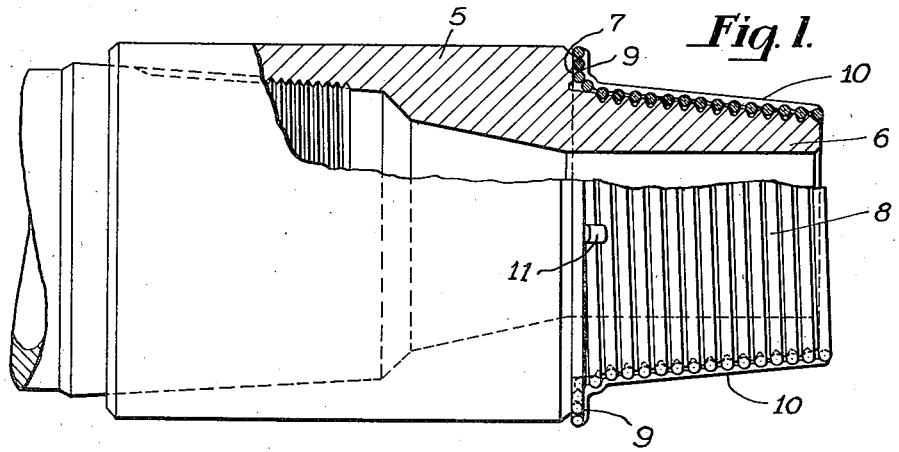
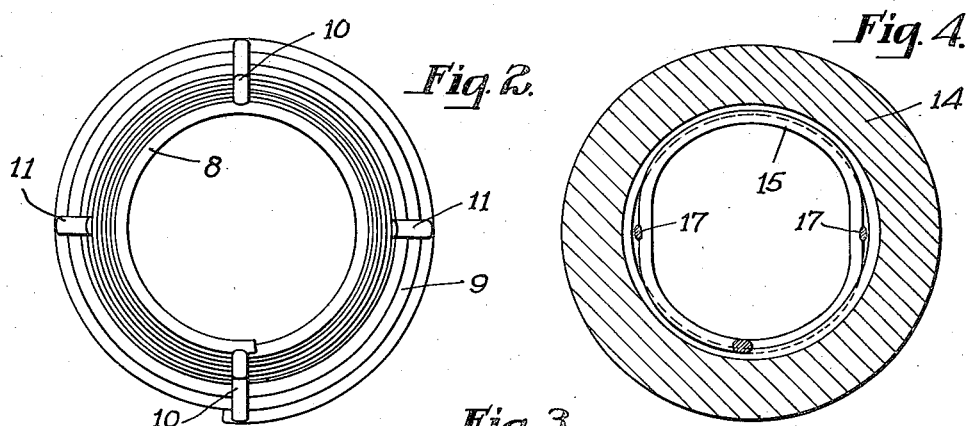
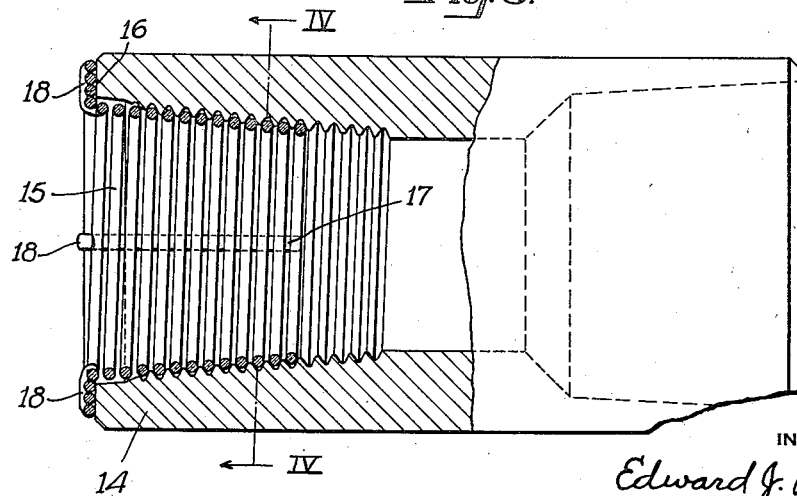
INVENTOR
Edward J. Protin,
By
Archworth Martin
attorney Patented Dec. 7, 1937

2,101,451

UNITED STATES PATENT OFFICE 2,101,451

THREAD PROTECTOR

Edward J. Protin, Charleroi, Pa., assignor to Pittsburgh Steel Company, Pittsburgh, Pa., a corporation of Pennsylvania Application September 1, 1936, Serial No. 98,871

4 Claims. (Cl. 138—96)

This invention relates to thread protectors which are especially suitable for use with the tool joint members of well drilling equipment, whereby said members are protected against damage during shipment and handling.

My invention has for its object the provision of a protector comprising wire coiled in such form as to adequately protect not only the threads of tool joint members and the like, but which will also protect the smooth-faced shoulder surfaces of said members, whereby they are protected against such damage as might result in leakage at those points when the tool joint has been assembled.

Some of the forms which my invention may take are shown in the accompanying drawing, wherein Figure 1 is a side view of the pin member of a tool joint, partly in section, with my protector applied thereto; Fig. 2 is an inner end view of the protector of Fig. 1; Fig. 3 is a side view, partly in section, of the box member of a tool joint with my protector in place, and Fig. 4 is a view taken on the line IV—IV of Fig. 3.

Referring first to Figs. 1 and 2, I show the protector applied to the pin member 5 of a tool joint, which pin member has the usual nipple-like threaded extension 6 and is provided with a shoulder 7 against which the end of a box member will seat to provide a seal. It is important to protect not only the thread, but the shoulder surface at 7 against damage during shipment. If the shoulder is damaged in any manner, it will be difficult or impossible to effect a fluid-tight seal at that point.

The protector is composed of a wire coil 8 wound to spiral or helical form upon a suitable mandrel, with a flange-like portion 9 formed thereon by means of superposed turns of wire. When the coil has been wound, the turns thereof are secured rigidly together in any suitable manner, as by the deposit of welding metal or solder at 10. The welding metal may be deposited by the arc weld method and is continued across the face of the base turns 9. The base turns are additionally secured together by welding metal deposited thereon at 11, and in some cases it will not be necessary to extend these latter lines of weld clear to the outer end of the coil.

The coil is preferably of metal which is softer than the metal of the tool joint members, and suitably may be of standard soft annealed wire having about .01 carbon content. The coils are wound on a pitch substantially equal to the pitch of the tool threads with which they are to be used, and are applied by screwing them onto the tool joint member.

Since the protector is of relatively soft metal, the flange 9 will prevent damage to the shoulder 7, and blows at that vicinity, while they may damage or flatten the wire somewhat, will not cause injury to the shoulder 7.

In Figs. 3 and 4, I show the box member 14 of a tool joint and a coil thread protector 15 applied thereto. This coil may be formed on a mandrel and have its turns soldered or welded together in substantially the same manner as the coil of Figs. 1 and 2, and will likewise be of relatively soft metal.

The coil 15 may be made of somewhat shorter length than the coil 8, since its primary purpose is to provide protection for the end 16 of the box, during shipment and handling. When a tool joint is assembled, the end 16 will have abutting engagement with the shoulder 7 and both must, of course, be free from injury, if a water-tight seal is to be had.

The turns of the box portion of the protector 15 are secured together by welding metal or solder deposited along the lines 17, while the base turns of the protector are secured together and reinforced by welding metal deposited at the points 18. As shown in Fig. 4, the sides of the protector are depressed somewhat along the weld lines 17, so that the protector can be entered into the box 14. While the weld metal at 17 could be inserted interiorly of the protector and thus permit of the completed protector having circular contour, it is simpler and more convenient to apply the welding metal on the exterior surface of the coil.

In each form of protector it is desirable that more than two radially-extending lines of weld be provided in order to stiffen such flanges and render them more resistant to displacement forces. The securing of the superposed turns together by the arc welding method is likewise desirable, because the welding metal thus deposited provides in effect radially-extending ribs, which securely hold the turns against relative displacement under forces exerted axially.

I claim as my invention:

1. A thread protector for tool joint members and a like, comprising a helically wound coil having a plurality of radially superposed turns at one end thereof, the said superposed turns being secured together by the fusing of metal thereto in the form of ribs disposed along radially-extending lines.

2. A thread protector for tool joint members and the like, comprising a helically wound coil having a plurality of radially superposed turns at one end thereof, the coil being of material softer than the metal of the joint members, and the said superposed turns being secured together by the fusing of metal thereto in the form of ribs disposed along radially-extending lines.

3. A thread protector comprising a helically wound coil the turns of which are secured together by the fusing of metal on the exterior surface thereof, in the form of ribs disposed along lines extending axially of the protector.

4. A thread protector comprising a helically wound coil the turns of which are secured together by the fusing of metal on the exterior surface thereof, in the form of ribs disposed along lines extending axially of the protector, the turns of the coil being deformable radially inward along said lines to permit use of the protector in an internally threaded member.

EDWARD J. PROTIN.